US009992702B2

(12) United States Patent
Sugaya

(10) Patent No.: US 9,992,702 B2
(45) Date of Patent: *Jun. 5, 2018

(54) WIRELESS COMMUNICATION APPARATUS, A METHOD OF WIRELESS COMMUNICATION, AND A PROGRAM FOR WIRELESS COMMUNICATION

(71) Applicant: Sony Corporation, Tokyo (JP)

(72) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/133,562

(22) Filed: Apr. 20, 2016

(65) Prior Publication Data

US 2016/0234717 A1  Aug. 11, 2016

Related U.S. Application Data

(63) Continuation of application No. 14/290,143, filed on May 29, 2014, now Pat. No. 9,357,470, which is a
(Continued)

(30) Foreign Application Priority Data

May 16, 2003  (JP) .............................. P2003-139547

(51) Int. Cl.
*H04W 28/06* (2009.01)
*H04L 1/16* (2006.01)
(Continued)

(52) U.S. Cl.
CPC ........... *H04W 28/06* (2013.01); *H04L 1/1614* (2013.01); *H04L 67/147* (2013.01); *H04L 69/22* (2013.01);
(Continued)

(58) Field of Classification Search
CPC ... H04W 40/00; H04W 72/04; H04W 28/065; H04W 28/06; H04W 74/00; H04W 84/18;
(Continued)

(56) References Cited

U.S. PATENT DOCUMENTS 5,179,658 A   1/1993  Izawa et al.
5,930,265 A   7/1999  Duault et al.
(Continued)

FOREIGN PATENT DOCUMENTS

JP   10-247942      9/1998
KR   100255503 B1   5/2000
KR   100739262 B1   7/2007

OTHER PUBLICATIONS

ARIB STD-T72 (p. 102), Document illustrates a MAC header structure defined 5 in a small power data communication system/ wireless 1394 as a data frame example. (Sep. 2001).
(Continued)

*Primary Examiner* — Andrew Lai
*Assistant Examiner* — Chuong M Nguyen
(74) *Attorney, Agent, or Firm* — Lerner, David, Littenberg, Krumholz & Mentlik, LLP

(57) ABSTRACT

In wireless communication with another communication apparatus in a predetermined wireless network, overhead information defined in a media access control layer is divided into a header of information necessary for the common access control and a header of information necessary for each payload. Address information is added to the header of information necessary for the common access control to transmit the generated header attached to the transmission data. For example, in a case of forming a physical burst in which a plurality of data payloads are combined into one, a frame structure is provided without useless repetition of address information.

15 Claims, 16 Drawing Sheets

Related U.S. Application Data continuation of application No. 13/941,952, filed on Jul. 15, 2013, now Pat. No. 8,792,400, which is a continuation of application No. 12/781,370, filed on May 17, 2010, now Pat. No. 8,711,742, which is a continuation of application No. 10/834,798, filed on Apr. 29, 2004, now Pat. No. 7,746,842.

(51) Int. Cl.
　　*H04L 29/06* (2006.01)
　　*H04L 29/08* (2006.01)
　　*H04W 40/00* (2009.01)
　　*H04W 72/04* (2009.01)
　　*H04W 74/00* (2009.01)
　　*H04W 84/18* (2009.01)
　　*H04L 12/933* (2013.01)

(52) U.S. Cl.
　　CPC ......... *H04W 28/065* (2013.01); *H04W 40/00* (2013.01); *H04W 72/04* (2013.01); *H04L 1/1685* (2013.01); *H04L 29/06102* (2013.01); *H04L 49/15* (2013.01); *H04W 74/00* (2013.01); *H04W 84/18* (2013.01)

(58) Field of Classification Search
　　CPC ..... H04L 67/147; H04L 69/22; H04L 1/1614; H04L 29/06102; H04L 49/15; H04L 1/1685
　　See application file for complete search history.

(56) References Cited

U.S. PATENT DOCUMENTS

| | | | |
|---|---|---|---|
| 5,983,259 A | 11/1999 | Campbell et al. | |
| 6,219,697 B1 * | 4/2001 | Lawande | H04L 29/12254 709/220 |
| 6,498,866 B2 | 12/2002 | Charrier et al. | |
| 6,650,624 B1 | 11/2003 | Quigley et al. | |
| 6,650,636 B1 * | 11/2003 | Bradshaw | G06F 11/0757 370/352 |
| 6,665,313 B1 | 12/2003 | Chang et al. | |
| 6,671,289 B1 | 12/2003 | Tamura et al. | |
| 6,738,821 B1 | 5/2004 | Wilson et al. | |
| 6,993,026 B1 | 1/2006 | Baum et al. | |
| 7,002,993 B1 | 2/2006 | Mohaban et al. | |
| 7,042,905 B1 | 5/2006 | Johnson | |
| 7,103,065 B1 | 9/2006 | Quigley et al. | |
| 7,272,156 B2 | 9/2007 | Shoemake et al. | |
| 7,376,091 B1 | 5/2008 | Eccles et al. | |
| 7,630,403 B2 | 12/2009 | Ho et al. | |
| 7,633,970 B2 * | 12/2009 | van Kampen | H04L 69/04 370/473 |
| 7,924,728 B2 | 4/2011 | Riga et al. | |
| 8,792,400 B2 * | 7/2014 | Sugaya | H04L 1/1614 370/208 |
| 9,357,470 B2 * | 5/2016 | Sugaya | H04L 1/1614 |
| 2001/0053141 A1 | 12/2001 | Periyalwar et al. | |
| 2002/0126988 A1 | 9/2002 | Togashi et al. | |
| 2002/0141652 A1 | 10/2002 | Charrier et al. | |
| 2003/0021270 A1 | 1/2003 | Bakker et al. | |
| 2003/0081538 A1 | 5/2003 | Walton et al. | |
| 2003/0086366 A1 * | 5/2003 | Branlund | H04B 1/71052 370/208 |
| 2003/0161326 A1 | 8/2003 | Pazhyannur et al. | |
| 2003/0169769 A1 | 9/2003 | Ho et al. | |
| 2004/0063438 A1 * | 4/2004 | Hsu | H01Q 21/065 455/452.1 |
| 2004/0117498 A1 * | 6/2004 | Hashimoto | H04L 1/08 709/230 |
| 2004/0120292 A1 * | 6/2004 | Trainin | H04L 1/1854 370/338 |
| 2004/0121029 A1 | 6/2004 | Palpu et al. | |
| 2004/0122956 A1 | 6/2004 | Myers et al. | |
| 2004/0179475 A1 * | 9/2004 | Hwang | H04L 47/10 370/229 |
| 2004/0213571 A1 | 10/2004 | Penninckx et al. | |
| 2005/0015703 A1 * | 1/2005 | Terry | H04L 1/1685 714/776 |
| 2007/0223472 A1 | 9/2007 | Tachibana et al. | |
| 2008/0040498 A1 | 2/2008 | Setlur et al. | |

OTHER PUBLICATIONS

IEEE Draft P802.15.3 /D16 standard (p. 109) as an exemplary data frame structure of the existing technology.
IEEE std 802.11, 1999 edition (at p. 34) as an example of an existing data frame structure.
IEEE Std 802.11, 1999 edition (p. 71) as an example of an existing fragmentation process.
Callaway et al., "Home Networking with IEEE 802.15.4: A Developing Standard for Low-Rate Wireless Personal Area Networks", IEEE Communication Magazine, pp. 70-77, Aug. 2002.
Akyildiz et al., Medium Access Control Protocols for Multimedia Traffic in Wireless Networks, IEEE Network, pp. 39-47, Aug. 1999.
Heegard et al, Chapter 2, Evolution of 2.4 Ghz Wireless LANs, Wireless Local Area Networks: The New Wireless Revolution Edited by Benny Bing, pp. 29-78, Copyright 2002 John Wiley & Sons, Inc., Jul. 2002.
Part 11: Wireless LAN Medium Access Control (MAC) and Physical Layer (PHY) Specifications, ANSI/IEEE Std 802.11, 1999 Edition , The Institute of Electrical and Electronics Engineers, Inc., Aug. 1999.
Part 11: Wireless LAN Medium Access Control (MAC) and Physical Layer (PHY) specifications: High-speed Physical Layer in the 5 Ghz Band, IEEE Std 802.11a-1999, The Institute of Electrical and Electronics Engineers, Inc., Dec. 1999.
United States District Court, Central District of California, Santa Ana Division, *Broadcom Corp., et al.* v. *Sony Corp., et al.*, Case 8:16-cv-01052-JVS-JCG, "Broadcom's Invalidity Contentions Pursuant to P.R. 3-3 & 3-4," Filed Jan. 23, 2017, 1547 pages (Submitted in five parts).
United States District Court, Central District of California, *Broadcom Corp., et al.* v. *Sony Corp., et al.*, Case 8:16-cv-01052-JVS-JCG, "Order on Regarding Claim Construction," Document 150, Filed May 18, 2017, 41 pages.

* cited by examiner

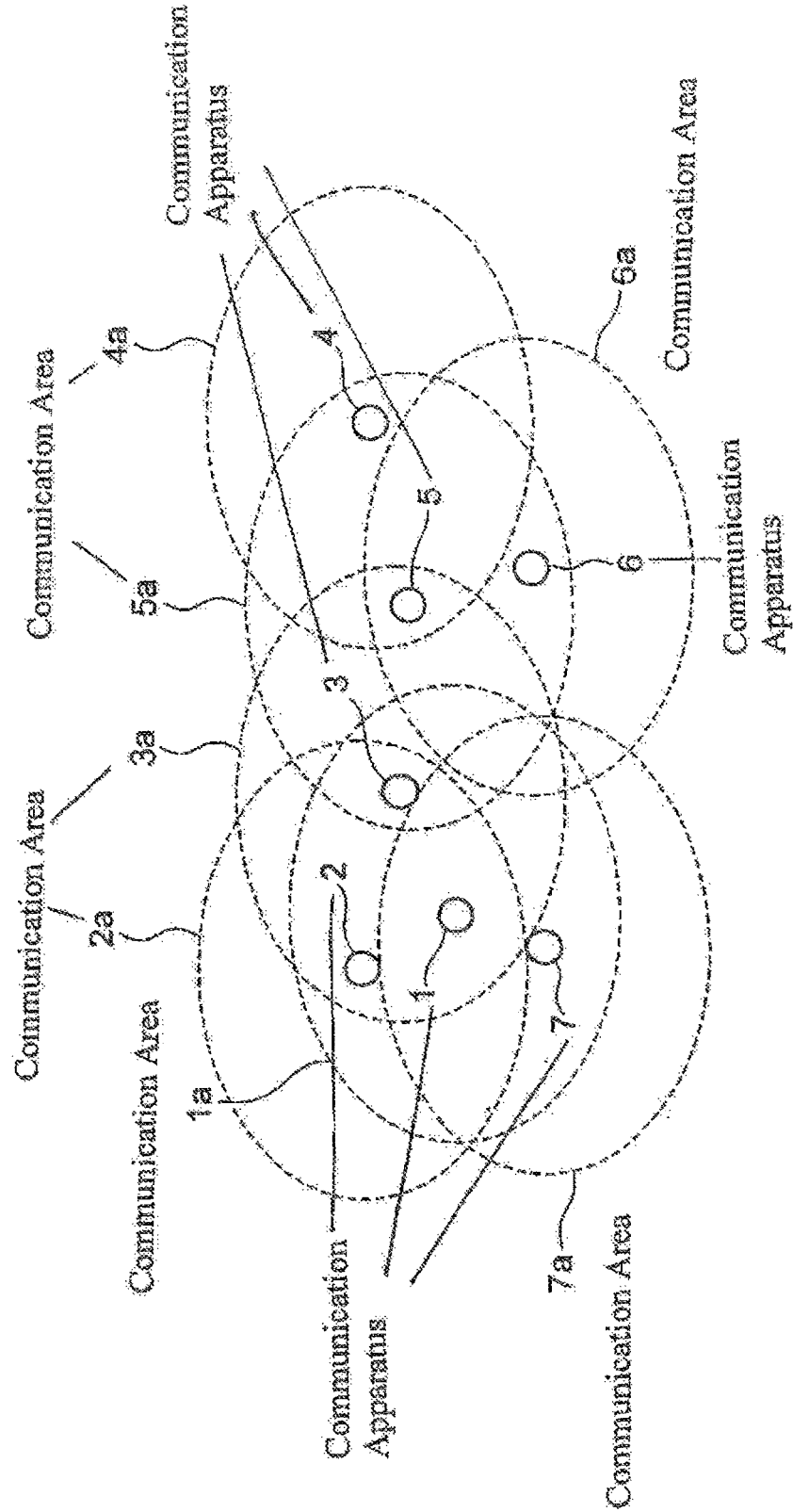

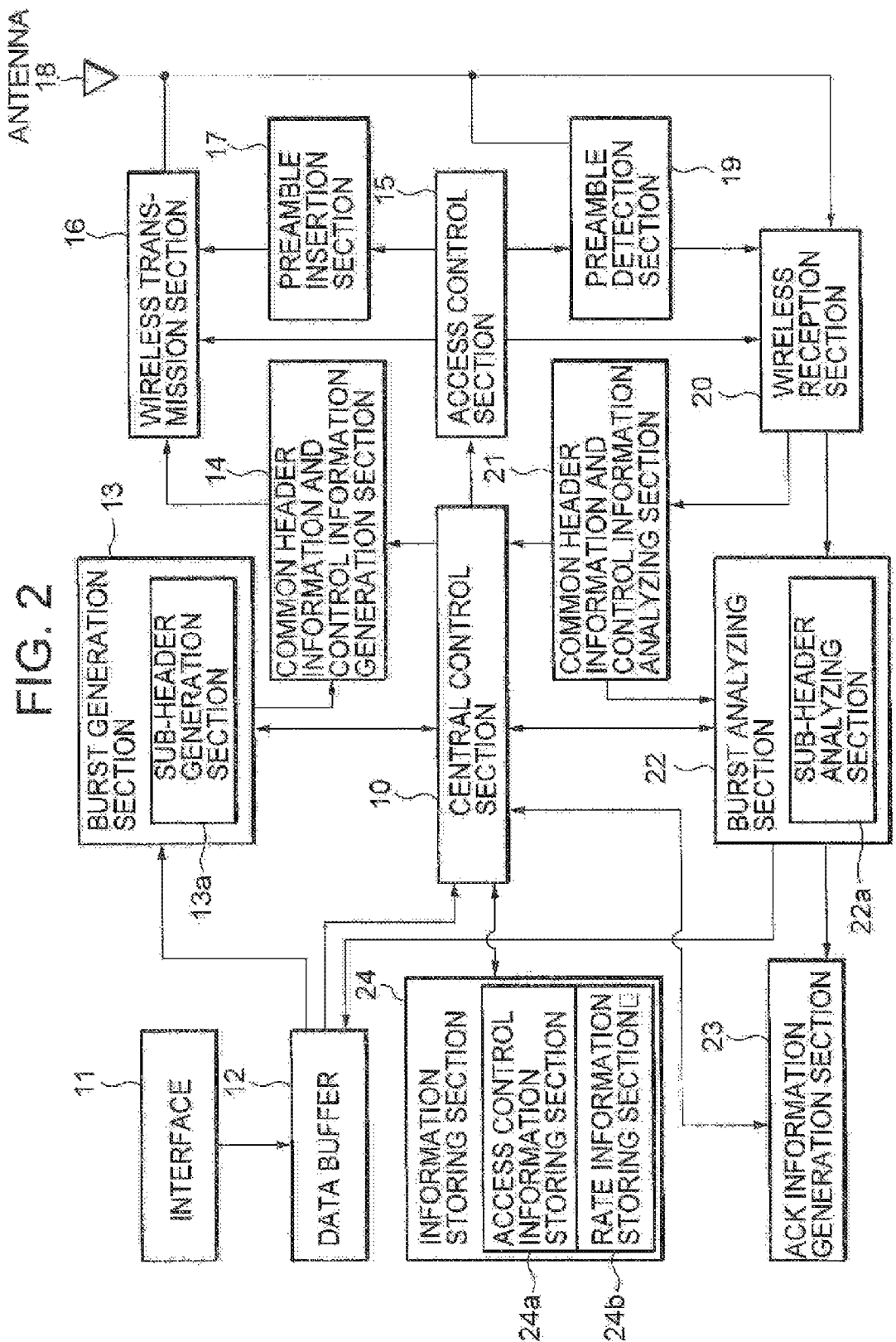

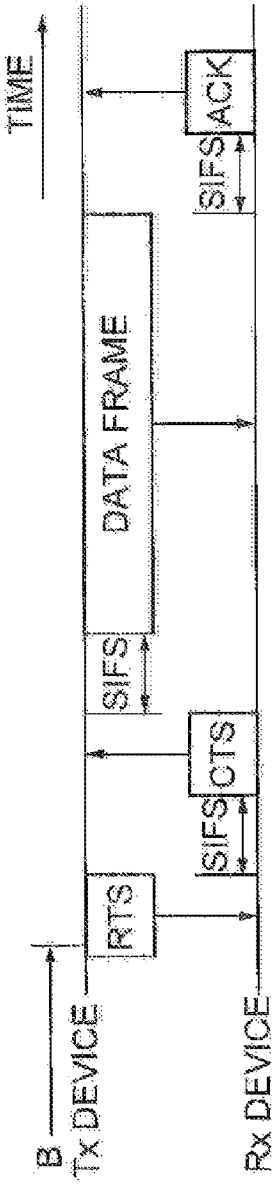
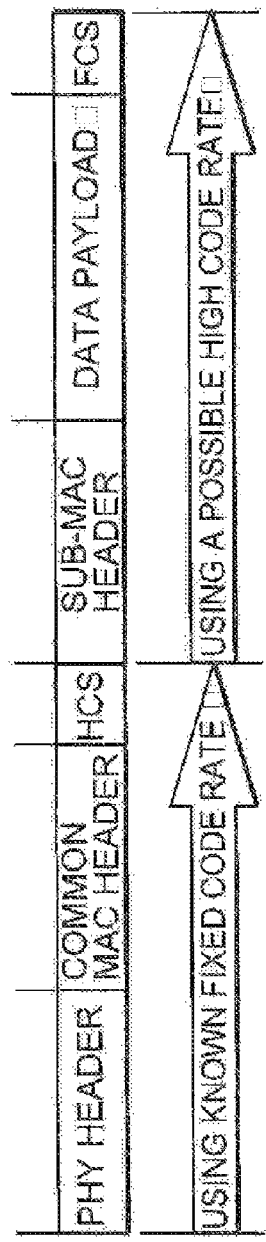

FIG. 18 PRIOR ART

| TRANSMISSION SOURCE STATION ID | TRANSMISSION DESTINATION ID | RELAY STATION ID |
|---|---|---|
| PACKET TYPE | | |
| B/E FLAG | SEQUENCE NUMBER | |
| | Length | RESERVED |

FIG. 19 PRIOR ART

Octets:

| 1 | 3 | 1 | 1 | 2 | 2 |
|---|---|---|---|---|---|
| STREAM INDEX | FRAGMENTATION CONTROL | SERVICE DEVID | DESTINATION DEVID | PNID | FRAME CONTROL |

MAC HEADER

| 0-4 | VARIABLE |
|---|---|
| FCS | FRAME BODY |

MAC FRAME

WIRELESS COMMUNICATION APPARATUS, A METHOD OF WIRELESS COMMUNICATION, AND A PROGRAM FOR WIRELESS COMMUNICATION

CROSS REFERENCES TO RELATED APPLICATIONS

This application is a continuation of U.S. application Ser. No. 14/290,143, filed on May 29, 2014, which is a continuation of U.S. application Ser. No. 13/941,952, filed on Jul. 15, 2013 (U.S. Pat. No. 8,792,400), which is a continuation of U.S. application Ser. No. 12/781,370, filed on May 17, 2010 (U.S. Pat. No. 8,711,742), which is a continuation of U.S. application Ser. No. 10/834,798, filed on Apr. 29, 2004 (U.S. Pat. No. 7,746,842), which is based on Japanese Priority Document JP 2003-139547, filed in the Japanese Patent Office on May 16, 2003, the disclosures of which are being incorporated herein by reference.

BACKGROUND OF THE INVENTION

Field of the Invention

This invention relates to a communication apparatus, a method of communication, and a program executing a process for communication, which are preferably applicable to, for example, a wireless LAN (Local Area Network) system for data communication.

Description of Related Art

Conventionally, in wireless communication in which a predetermined transmission unit of packets are collectively transmitted, it is general that a structure of packet information of each transmission unit is determined in advance and the packet information is added to each packet to be transmitted.

On the other hand, in a rate variable transmission method for a general wireless communication system, it is known that transmission is carried out by a mechanism called fall back at a possible highest rate. When an error occurs, the transmission rate is decreased to a predetermined transmission rate for re-transmission.

In a rate variable control method for these wireless communication systems, there was proposed one in which header information includes rate information regarding a modulation process of a payload portion on the basis of a predetermined frame format. In the method, in a case where the header information can be decoded, a desired payload portion is decoded at a rate that is changed to the rate of the modulation process.

Here, in the conventional wireless communication system, a possible transmission rate is substantially determined in accordance with a bandwidth of a signal used in the wireless communication.

That is, in a certain wireless communication system, since a data rate for transmitting an application is substantially determined in accordance with its bandwidth. For example, an IEEE (The Institute of Electrical and Electronics Engineers) 802.11b-compliant wireless communication system has been designed to use a data rate of several megabits/sec and an IEEE 802.11a-compliant wireless communication system has been designed to use a data rate of tens megabits/sec.

Therefore, a fragment process and a frame structure, optimized for each wireless communication system, are specially prepared as a unique structure for each system.

FIG. 18 illustrates a MAC header structure defined in a small power data communication system/wireless 1394 system (ARIB STD-T72) (at page 102 of the standard book) as an existent data frame example.

The MAC header of this wireless communication system includes information such as a packet type, a transmission source station ID, a transmission destination station ID, a relay station ID, a B/E flag, a sequence number, and a data length (Length).

In such an existing wireless communication system, the MAC header information is formed in which information pieces of address information such as a destination and a transmission source, a sequence number, a data length, and presence and absence of a fragment are mixed.

FIG. 19 illustrates a MAC header and a frame body according to a frame format defined by the IEEE Draft P802.15.3/D16 standard (page 109) as an exemplary data frame structure of the existing technology according to Related Art.

In the figure, a MAC header includes a Frame Control (two Octets), a PN ID (two Octets), a Destination DEV ID (one Octet), a Source DEV ID (one Octet), a Fragmentation Control (three Octets), and a Stream Index (one Octet).

This case features that all address information pieces are represented by a DEV ID (device identifier). Further, contents of a predetermined fragment process are represented by a predetermined bit at a Fragmentation control field. In addition to the MAC header, a Frame Body (variable length) as a data payload and an FCS (4 Octets) for error detection constitutes a frame. Though it is not shown between the MAC header and the MAC frame in the figure, a header check sequence (HCS) may be further provided.

FIG. 20 illustrates a frame format defined by the IEEE Std 802.11, 1999 edition (at page 34) as an example of an existing data frame structure.

The MAC header includes a Frame Control (two Octets), a Duration ID (two Octets), an Address 1 (six Octets), an Address 2 (six Octets), an Address 3 (six Octets), a Sequence Control (two Octets), and an Address 4 (six Octets). In addition, a frame body (0-2312 Octets) as a data payload and FCS (four Octets) are also included therein.

Address fields of the Address 1 to the Address 4 in this configuration are occasionally assigned to a source address, a destination address, or the like, if necessary. Further, sequence number information and the like are described at the Sequence Control field.

FIG. 21 shows a fragment structure defined in the IEEE Std 802.11, 1999 edition (page 71) as an example of an existing fragmentation process.

In this fragment structure, a predetermined MSDU is divided into four fragments, namely, Fragment 0 to Fragment 3. A MAC header and a CRC (Cyclic Redundancy Check) are added to each fragment. It is understood that, when the fragmentation process is executed, MAC header information is attached to each fragment.

FIG. 22 shows an example in which a plurality of MAC frame information pieces are formed in one PHY burst according to a related art technique. This shows that the sequences #1 to #3 are combined to form a single burst with once generated MAC header and FCS (CRC) attached thereto. That is, there exists each MAC header of the sequences #1 to #3 being multiplexed.

It is also understood that even if such a data frame format is adopted, a sequence number and fragment information of a data payload are necessary for each sequence, but the reception destination address information and the transmission source address information and the like are commonly used.

The Patent Document 1 cited below discloses an example of such a header structure.

[Patent Document 1]

Japanese Patent Application Publication No. Hei 10-247942

As described above, in the related art frame format, the MAC headers are generally multiplexed as they are. Thus, there is a problem that redundant fields such as address information exist at the MAC header more than the necessity.

Further, in a case where a predetermined transmission unit of packets are transmitted collectively, the same information such as address information is included as header information during transmission at each packet. Thus, there is a problem that such header information becomes redundant.

SUMMARY OF THE INVENTION

In view of the problem described above, the present invention provides effective packet construction suitable for a case of employing a communication system such as a wireless LAN system.

According to an aspect of the present invention, in a case of wireless communication with another communication apparatus through a predetermined wireless communication network, overhead information defined at a media access control layer is divided into a first header including data necessary for common access control and a second header including data necessary for each payload, in which address information is added to the first header including the data necessary for the common access control, and the generated headers are added to transmission data for transmission.

For example, in a case of forming a physical burst (PHY burst) with a plurality of data payloads combined into one, this structure provides a frame configuration without useless repetition of the address information.

According to the present invention, overhead information defined in a MAC layer is formed with a single piece of common MAC header information and a sub-MAC header in a frame structure. This efficiently provides a data frame and a corresponding control information frame.

In addition, in a case of transmitting a plurality of data payloads in the form of a single frame (burst), only the sub-MAC header is added to each payload, which results in configuration of a frame with minimum requirement parameters.

Further, since a frame is formed with portions (a PHY header and the common MAC header) transmitted at a known fixed transmission rate and the other portions (the sub-MAC header and the data payload) transmitted at a variable transmission rate, in a case where a plurality of frames are sequentially connected to form a frame, a transmission frame can be provided with compression for overlapped information in the MAC header information.

In addition, since the address information is described at the common MAC header, and its error detection code is added thereto, only the information of which address can be correctly decoded is instantaneously obtained.

Still furthermore, length information and a sequence number of the data payload length, a sequence number, and fragment information are added to the sub-MAC header, so that the information in the common MAC header is allowed to include only minimum requirement information.

Furthermore, at the PHY header, rate information used for the data payload is informed, so that a margin can be provided for a time interval from when the rate is specified until the rate is actually changed.

In addition, fragmentation process in which the data payload formed using the sub-MAC header is fragmented at a predetermined length provides a suitable frame structure for cases using various ARQ methods.

Since the description of the fragment unit at the common MAC header prevents the error from affecting the later part, even in a case where there is an error in the data, thus providing a frame structure efficient, for example, for the selectively repeat ARQ.

Forming the common MAC headers in the same configuration between a control information frame and a data frame provides easy multiplexing, so that a single burst can be simply formed.

Forming the control information frame in the predetermined common MAC header structure makes multiplexing a plurality of control information frames easy, so that a single burst can be simply formed.

BRIEF DESCRIPTION OF THE DRAWINGS

The object and features of the present invention will become more readily apparent from the following detailed description taken in conjunction with the accompanying drawings and the same or corresponding elements or parts are designated with like references throughout the drawings in which:

FIG. 1 is an illustration showing an example of a wireless network configuration according to an embodiment of the present invention;

FIG. 2 is a block diagram of an exemplary wireless communication apparatus according to the embodiment of the present invention;

FIG. 3 is a time chart illustrating an exemplary transmission super frame period according to the embodiment of the present invention;

FIGS. 4A and 4B is a time chart illustrating an exemplary data transmission sequence according to the embodiment of the present invention;

FIG. 5 is an illustration describing an outline of a frame format according to the embodiment of the present invention;

FIG. 18 is an illustration describing an MAC header according to related art;

FIG. 19 is an illustration showing an example of a MAC header and body frame format according to related art;

DETAILED DESCRIPTION OF THE PREFERRED EMBODIMENT

Figure 6:
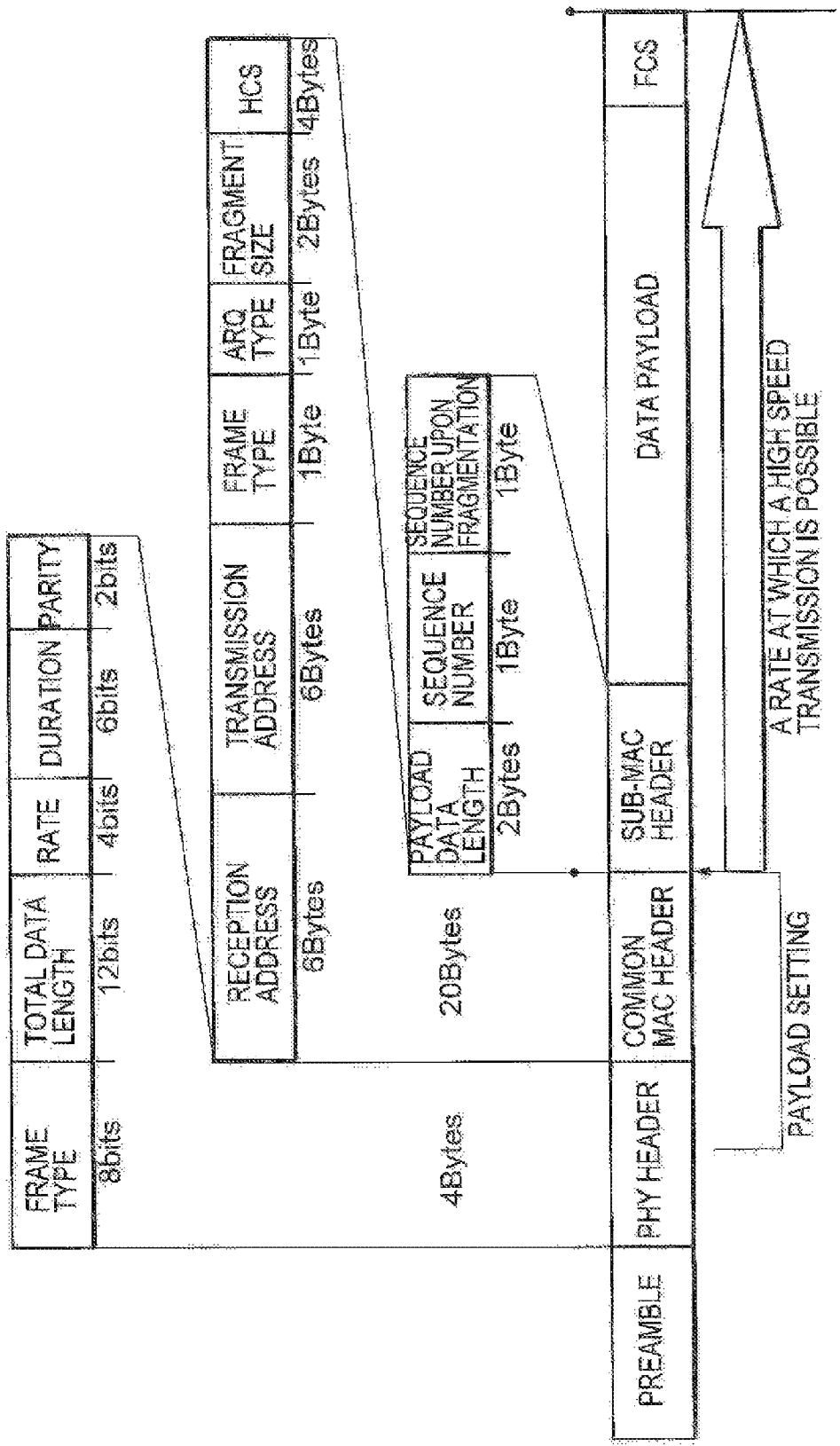
FIG. 6 is an illustration describing an exemplary data frame format according to the embodiment of the present invention.

An embodiment of the present embodiment will be described below with reference to FIGS. 1 to 17.

This embodiment assumes that a propagation path of communication is wireless and that a network is formed among a plurality of apparatuses with a single transmission medium (a link is not divided with frequency channels). However, if a plurality of frequency channels exist as a transmission medium, the same result can be achieved also. Further, the communication assumed in this embodiment is a stored and forward type traffic in which information is transmitted in a packet unit. Further, the network according to this embodiment is an ad hoc network in which there is no control station for controlling overall stations in the network. However, the present invention is applicable to a network including a control station, as mentioned later.

FIG. 1 shows an exemplary arrangement of communication apparatuses (communication stations) forming a wireless communication system according to the embodiment of the present invention. This illustrates that seven communication apparatuses 1, 2, - - - 7 are distributed in a single space.

In FIG. 1, communication areas 1a, 2a, - - - , and 7a of the communication apparatuses 1, 2, - - - , and 7, respectively, are denoted with chain lines. It is defined that each area in which each of the communication apparatuses is communicable with other communication apparatuses existing within the area and also causes interference with its own transmission in the area, as follows:

The communication apparatus 1 exits in an area communicable with the adjacent communication apparatuses 2, 3, and 7.

The communication apparatus 2 exits at in area communicable with the adjacent communication apparatuses 1 and 3.

The communication apparatus 3 exits in an area communicable with the adjacent communication apparatuses 1, 2, and 5.

The communication apparatus 4 exits in an area communicable with the adjacent communication apparatus 5.

The communication apparatus 5 exits in an area communicable with the adjacent communication apparatuses 3, 4, and 6.

The communication apparatus 6 exits in an area communicable with the adjacent communication apparatus 5.

The communication apparatus 7 exits in an area communicable with the adjacent communication apparatus 1.

In this embodiment, each communication apparatus performs an access control process in which one wireless transmission path is time-divisionally used with consideration of influence among the communication apparatus and the adjacent other communication apparatuses.

FIG. 2 is a block diagram of each wireless communication apparatus as a communication station in this exemplary system. This wireless communication apparatus includes an interface 11 for exchanging various information with a device (not shown) coupled to this wireless communication apparatus, and a data buffer 12 for temporarily storing the data transmitted from the connected device through the interface 11 and the data received through the wireless transmission path.

The wireless communication apparatus further includes a central control section 10 for unitedly effecting control of both a sequential information transmission and reception process and an access control of the transmission path. The wireless communication apparatus further includes a burst generation section 13 for generating a frame burst from the transmission data as a processing section executing transmission process under the control of the central control section 10, a common header information and control information generation section 14 for generating a common MAC header information and control information, and a wireless transmission section 16 for transmitting these information. The burst generation section 13 of the present example includes a sub-header generation section 13a for generating sub-header information in a predetermined unit. A preamble specified by a preamble insertion section 17 is inserted into a packet to be transmitted by the wireless transmission section 16.

The wireless communication apparatus further includes, as a processing section for a reception process under the control by the central control section 10, a wireless reception section 20 receiving an reception signal, a common header information/control information analyzing section 21 for analyzing the common header information and the control information in the signal received by the wireless reception section 20, and a burst analyzing section 22. Reception in the wireless reception section 20 is executed at a timing depending the detection of a preamble in a preamble detection section 19.

Transmission process in the wireless transmission section 16 and reception process in the wireless reception section 20 are performed at a timing under control of an access control section 15, respectively. The wireless transmission section 16 executes a modulation process, for example, for an Ultra Wideband (UWB) signal on a signal to be transmitted. The wireless reception section 20 executes a demodulation process, for example, for the Ultra Wideband (UWB) signal on a received signal and supplies demodulated data to a later stage of a circuit. An antenna 18 for transmitting and receiving a wireless signal is coupled to the wireless transmission section 16 and the wireless reception section 20. Here, it is also possible to prepare individual antennas for the transmission and the reception, respectively. Further, it is also possible to prepare a plurality of antennas to provide so-called diversity reception.

A common header information/control information analyzing section 21 extracts a common header section from the received signal and analyzes it. The burst analyzing section 22 analyzes the structure of a received data burst from the received common header information. The burst analyzing section 22 further includes a sub-header analyzing section 22a for analyzing sub-headers in the received data burst. The burst analyzing section 22 recognizes the data received in a sub-header unit and includes an ACK information generation section 23 for generating ACK information indicative of the reception confirmation. An information storing section 24 is further coupled to the central control section 10, as storing regions of the information storing section 24, an access control information storing section 24a and a rate information storing section 24b necessary for constituting the burst.

The above description is made with an example of the UWB system as a wireless communication system. However, it is also possible to use other various communication systems applicable, for example, to a wireless LAN, and suitable for communication having a relative near field communication. More specifically, as a system other than the UWB system, the OFDM (Orthogonal Frequency Division Multiplex) method, the CDMA (Code Division Multiple Access) method, and the like are applicable.

Next, transmission conditions at the wireless communication apparatuses in the network of this example will be described with reference to FIGS. 3 to 13. FIG. 3 shows an exemplary frame configuration (a unit of transmission super frame period) adopted in the system of this example. In this example, one super frame period is defined by transmission of a beacon signal B from each wireless communication apparatus, and the same period and a different offset timing are set for each wireless communication apparatus. That is, setting a beacon transmission position in each wireless communication apparatus different from any other wireless communication apparatus forms a self-organized distributed type of ad hoc wireless network. Transmitting a beacon signal B from a wireless communication apparatus provides a self-receiving region for a predetermined interval from the transmission to this wireless communication system.

FIG. 4A and FIG. 4B show an example of a data transmission sequence according to the RTS/CTS control in this example. This shows a sequence in which a data frame is transmitted from a transmission source apparatus (Tx device (FIG. 4A)) to a reception destination apparatus (Rx device (FIG. 4B)).

In this example, the transmission source apparatus transmits a request to send RTS to the reception destination apparatus. After a lapse of a predetermined interval SIFS, the reception destination apparatus returns a confirmation notice CTS to the transmission source apparatus. After a lapse of a predetermined interval SIFS, the transmission source apparatus transmits a data frame to the reception destination apparatus. After a lapse of a predetermined interval SIFS, the reception destination apparatus returns an acknowledge ACK to the transmission source apparatus.

FIG. 5 shows an outline of a data frame structure of this example. In this example, a common MAC (Media Access Control) header is arranged subsequent to a PHY header as a physical header. A header check sequence (HCS) for the common MAC header is arranged subsequent thereto. Further, after this, a sub-MAC header, a data payload, a frame check sequence (FCS) are arranged. Here, the PHY header, the common MAC header, and the HCS are transmitted at a fixed transmission rate according to a known code rate, and the sub-MAC header, the data payload, and the FCS are transmitted at a variable transmission rate depending on a code rate which is possible for the transmission. This provides transmitting the PHY header and the common MAC header to be transmitted to a wireless communication apparatus located at a rather remote from the transmission source apparatus and suitably transmitting the sub-MAC header and the data payload, and the FCS to the reception destination apparatus.

FIG. 6 shows a data frame structure according to this example. The data frame (burst) structure includes sections of a preamble, a PHY header as a physical header, a common MAC (Media Access Control) header, a sub-MAC header, a data payload, and a frame check sequence FCS.

The preamble includes a predetermined known sequence common among all wireless communication apparatuses and is provided for synchronization of data in an asynchronous data communication.

The PHY header used in a process in the physical layer includes sections of: a frame type (eight bits) indicative of the type of the frame in the data frame (burst) (frame type: eight bits); data of a total data length of the burst (total data length: twelve bits); data of a setting rate for the data payload section (four bits); duration of the data frame (burst) (duration: six bits); and a parity bits (parity: two bits). These numbers of bits are only examples, and the setting rate data for the data payload section is also indicative of a transmission rate of the sub-MAC header.

The MAC header is a header necessary for access control within the network and is divided into a common MAC header and a sub-MAC header in this example. The common MAC header includes sections of: an address of a reception apparatus (reception address: six bytes); an address of a transmission apparatus (transmission address: six bytes); a frame type indicative of the type of this MAC frame (frame type: one byte); a type of ARQ requested for the confirmation of receiving the data (ARQ type: one byte); a fragment size of the data payload (fragment size: two bytes); and a header check sequence (HCS: four bytes). Here, the numbers of bytes are only examples.

The sub-MAC header includes sections of: a payload length (payload data length: two bytes); a sequence number (one byte); and a sequence number in a case of fragmentation (fragment sequence number: one byte). The numbers of bytes herein are only examples. If necessary, it is also possible to add a header check sequence (HCS: four bytes) (not shown) for detecting an error at the sub-MAC header.

There are ARQ types usable for this wireless communication system such as a Stop-and-Wait ARQ (SW-ARQ), a Go-Back N ARQ (GBN-ARQ), and a selective repeat ARQ (SR-ARQ).

Figure 7:
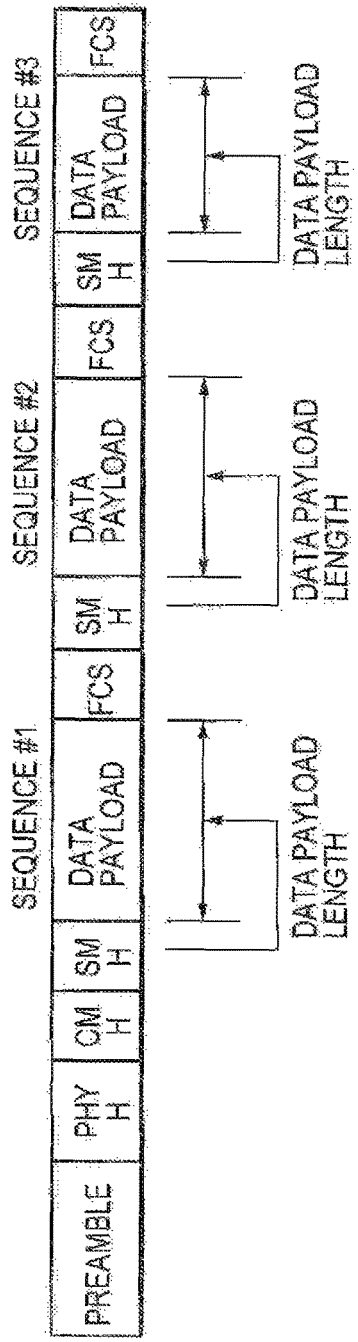
FIG. 7 is an illustration describing an exemplary multiplexed data frame format according to the embodiment of the present invention.

FIG. 7 shows an example of a data frame in which data payloads are multiplexed. In this case, the data frame (burst) structure includes, like the general data frame, one preamble, a PHY header (PHYH), and a common MAC header (CMH). Further, a plurality of sets of sub-MAC headers (SMH), data payloads, and frame check sequences (FCS) are attached. The structures of the common MAC header and the sub-MAC header are shown in FIG. 6 for example.

Each data payload is controlled with each sequence number (sequence #1, #2, #3) described in the sub-MAC header, has a data length represented by the payload data length in the sub-MAC header, and has the frame check sequence (FCS) thereafter for error detection and error correction.

This enables the transmission in which data frames directed to the same destination are efficiently combined into one burst.

Figure 8:
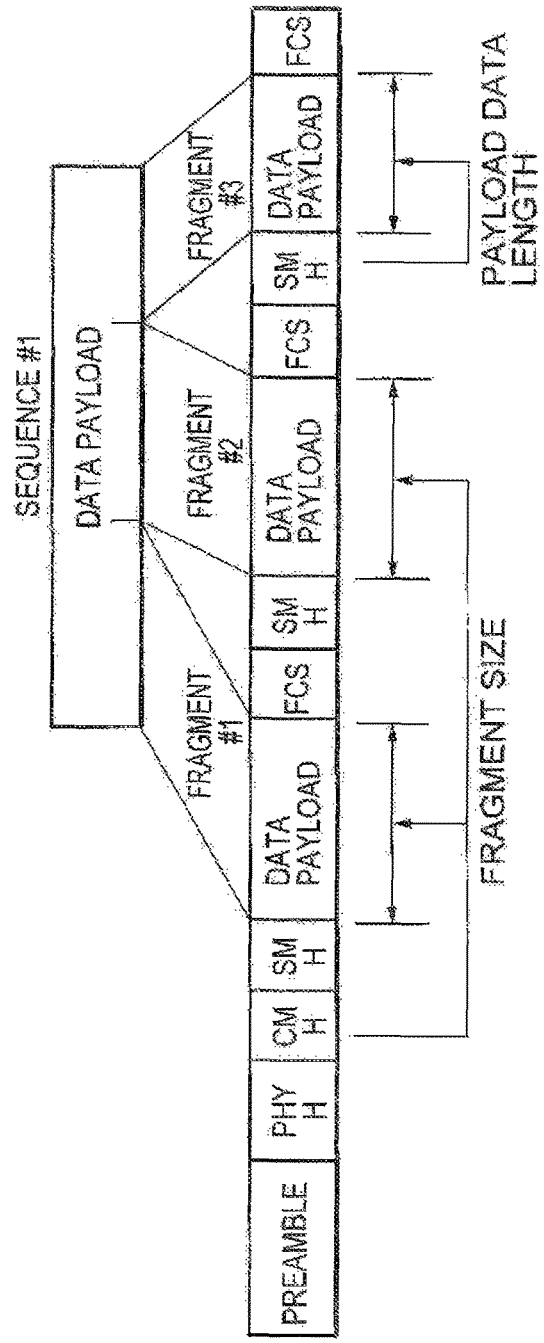
FIG. 8 is an illustration describing an exemplary fragmented data frame format according to the embodiment of the present invention.

FIG. 8 shows a frame structure of fragment data according to this example. The data frame (burst) structure includes, like the general data frame, one preamble, a PHY header (PHYH), and a common MAC header (CMH) and further includes a plurality of sets of sub-MAC headers (SMH), data payloads, frame check sequences (FCS) are attached thereto.

The data payload in a sequence, herein, the sequence #1, is divided into fragments (three parts in this example) on the basis of the Fragment Size information and each part is dealt as one data payload.

To each data payload, a sub-MAC header (SMH) and a frame check sequence (FCS) are added to enable error detection and error correction, so that a resending control is provided at this fragment unit.

In this example, because only the last payload has a length less than the fragment size, the Payload Length in the sub-MAC header for the fragment #3 indicates this.

Figure 9:
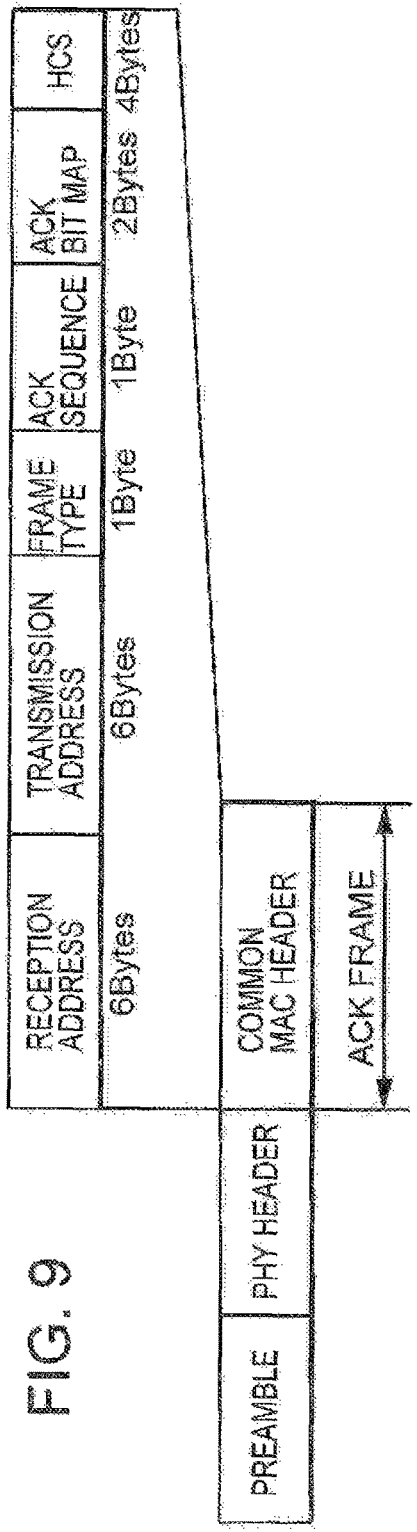
FIG. 9 is an illustration describing an exemplary ACK frame format according to the embodiment of the present invention.

FIG. 9 shows an ACK frame format using the common MAC header according to this example. The ACK frame is ACK information returned from the data reception destination to the data transmission source to return a reception confirmation of the data and is transmitted as shown in FIG. 4.

The ACK frame shown in FIG. 9 includes a preamble, a PHY header, and a common MAC header that has the same structure as the common MAC header in the general data frame (burst), so that the reception process is simplified.

The ACK frame includes sections of: an address of a reception apparatus (reception address: six bytes); an address of a transmission apparatus (transmission address: six bytes), a frame type indicative of the type of this MAC frame (frame type: one byte); an ACK sequence number (ACK sequence); bit map information (ACK bit map: two bytes) indicative of received parts in a case of fragmenting the ACK sequence; and a header check sequence (HCS: four bytes) for error checking the ACK frame. Here, the numbers of bytes are only examples.

Figure 10:
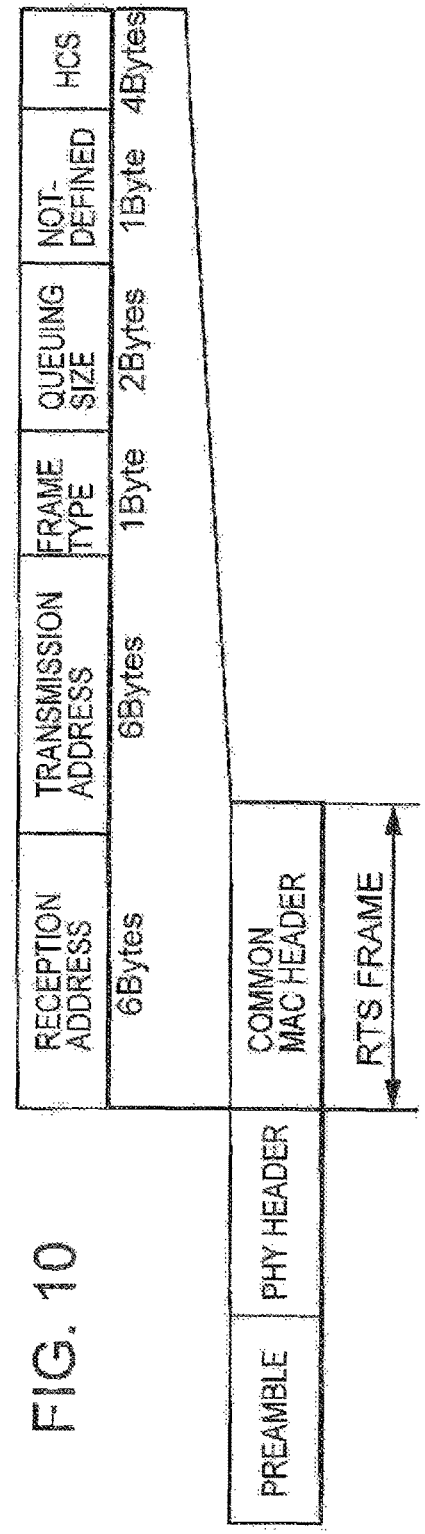
FIG. 10 is an illustration describing an exemplary RTS frame format according to the embodiment of the present invention.

FIG. 10 shows an RTS frame format using the common MAC header according to the example. The RTS frame is a transmission requesting signal transmitted from the data transmission source apparatus to the reception destination apparatus before the data transmission and is transmitted as shown in FIG. 4.

The RTS frame shown in FIG. 10 includes a preamble, a PHY header, and a common MAC header that has the same structure as the common MAC header in the general data frame (burst), so that the reception process is simplified.

The RTS frame includes sections of: an address of a reception apparatus (reception address: six bytes); an address of a transmission apparatus (transmission address: six bytes); a frame type indicative of the type of this MAC frame (frame type: one byte); an amount of the queued data to be transmitted (queuing size: two byte); a not-defined region for future extension (one byte); and a header check sequence (HCS: four bytes) for error checking the RTS frame.

Figure 11:
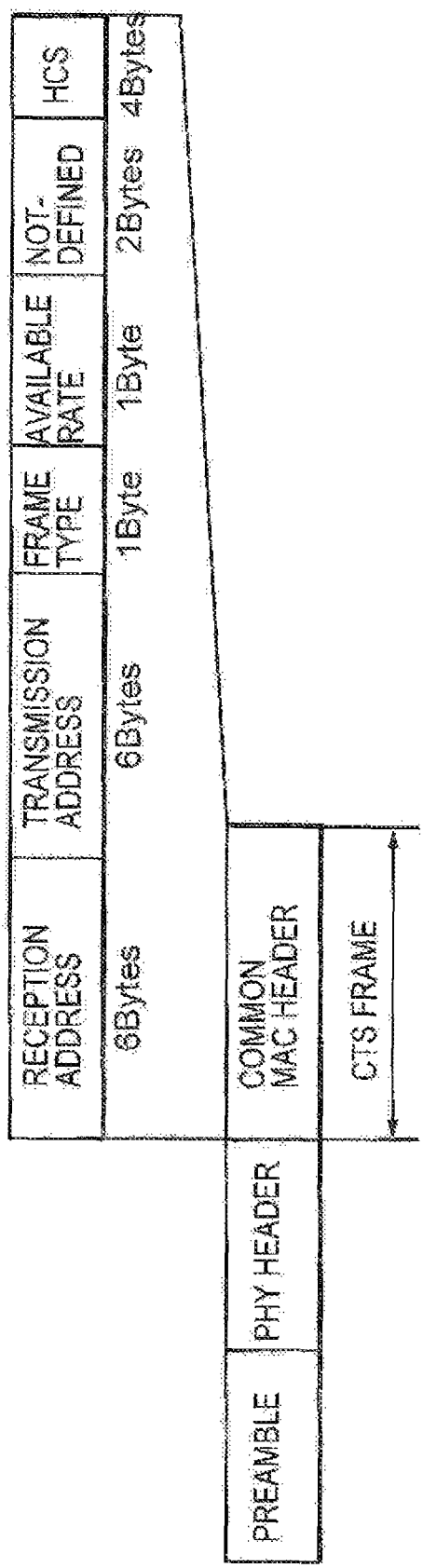
FIG. 11 is an illustration describing an exemplary CTS frame format according to the embodiment of the present invention.

FIG. 11 shows a CTS frame format using the common MAC header according to the example. The CTS frame is a transmission available condition signal and is transmitted from the data reception destination apparatus to the transmission source apparatus before the data transmission, as shown in FIG. 4.

The CTS frame shown in FIG. 11 includes a preamble, a PHY header, and a common MAC header that has the same structure as the common MAC header in the general data frame (burst), so that the reception process is simplified.

The CTS frame includes sections of: an address of a reception apparatus (reception address: six bytes); an address of a transmission apparatus (transmission address: six bytes); a frame type indicative of the type of this MAC frame (frame type: one byte); rate information (available rate: one byte); a not-defined region for future extension (one byte); and a header check sequence (HCS: four bytes) for error-checking the CTS frame.

Figure 12:
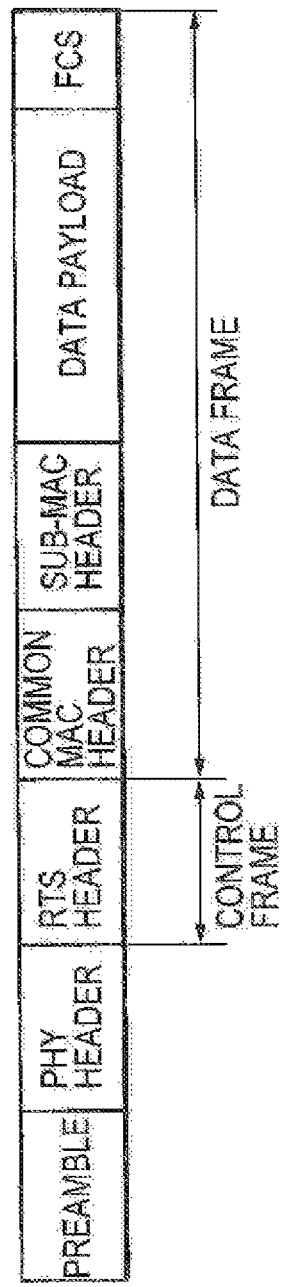
FIG. 12 is an illustration describing an exemplary format of the control frame+the data frame according to the embodiment of the present invention.

FIG. 12 shows an example of a burst in which the control information frame and the data frame are combined.

In this example, subsequent to a preamble and a PHY header, as a control information frame, an RTS frame is arranged. The RTS frame has the structure, for example, shown in FIG. 10. After this, a common MAC header, a sub-MAC header, a data payload, and a FCS are arranged as a data frame. The common MAC header and the sub-MAC header may have the structure shown in FIG. 6.

In the example shown in FIG. 12, the RTS frame is used as a control information frame. However, other frames (ACK frame, CTS frame, and the like) may be combined with the data frame. Further, in a burst including such a structure, it is possible to use a fixed transmission rate for the control information frame and the common MAC header and a variable transmission rate after the sub-MAC header. Further, in FIG. 12, the control frame is added before the data frame. However, the control frame may be attached after the data frame.

Figure 13:
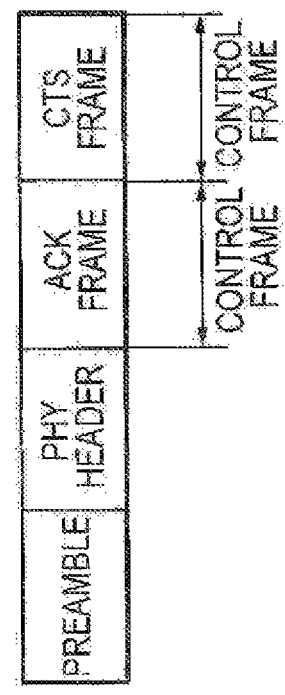
FIG. 13 is an illustration describing an exemplary format of a control frame+a control frame according to the embodiment of the present invention.
Figure 14:
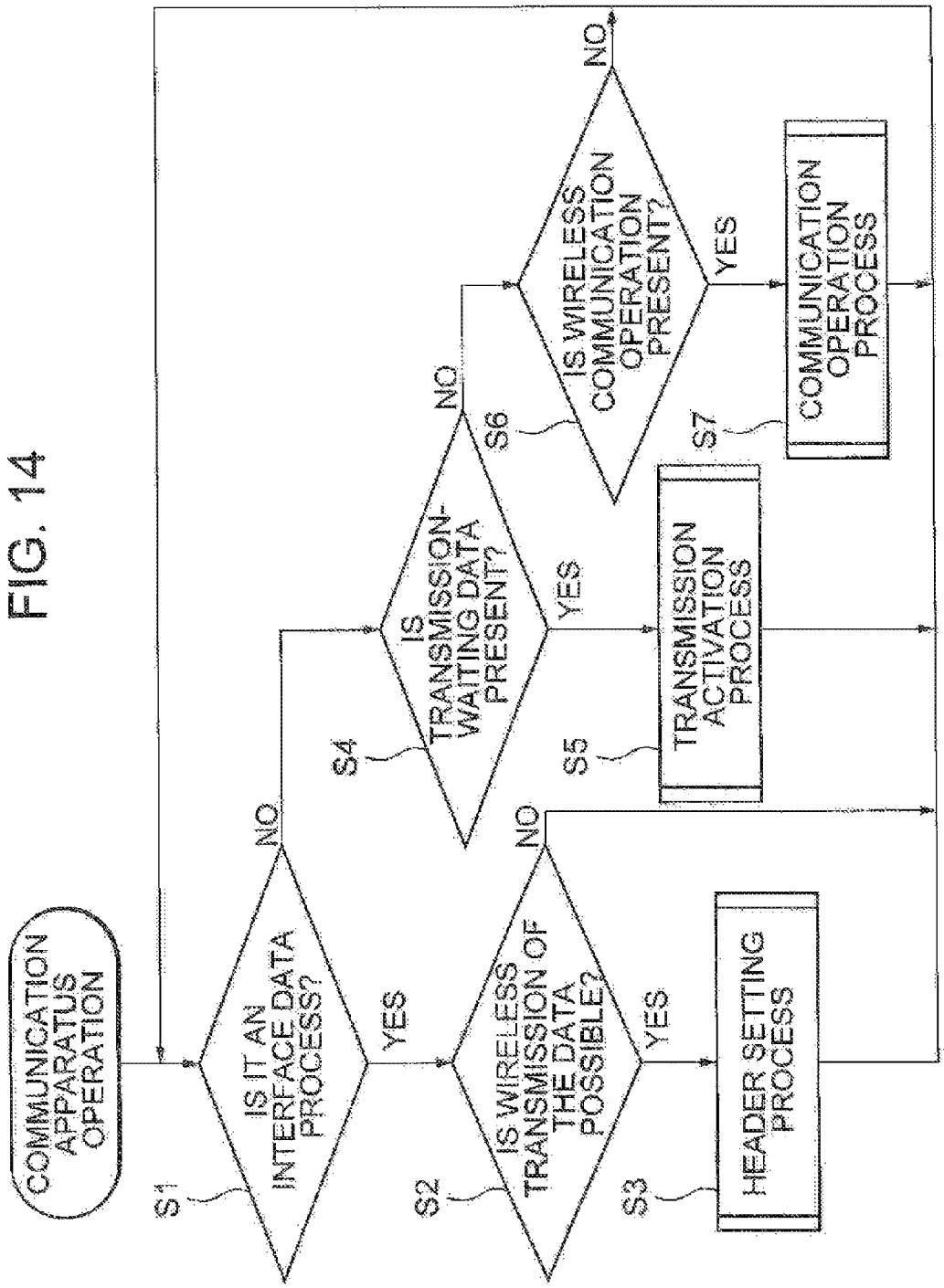
FIG. 14 is a flow chart showing an exemplary operation of the communication apparatus according to the embodiment of the present invention.

FIG. 13 shows a burst in which control frames are multiplexed. In this example, after the preamble and the PHY header, as the first control information frame, an ACK frame is arranged, and as the second control information frame, a CTS frame is arranged. The ACK frame and the CTS frame may have the structures shown in FIGS. 9 and 11, respectively. Further, it is also possible to combine it with other control information frames.

Next, a process for the communication operation by the central control section 10 in each wireless communication apparatus within the network will be described with reference to flow charts shown in FIGS. 14 to 17. First, the general operation of the communication apparatus will be described with the flow chart shown in FIG. 14. It is judged whether data is received from the device connected to the interface 11 (step S1). If the data is received in this judgment, it is judged whether the data can be wirelessly transmitted (step S2). In this case, for example, beacon information is previously collected from the wireless communication apparatuses therearound and it may be judged that the data transmission is possible when a wireless communication apparatus capable of communication exists, on the basis of the beacon information.

If the wireless transmission is possible, a header setting process is executed (step S3) and the processing returns to step S1. If the transmission is impossible, the processing directly returns to step S1.

If the data is not received in step S1, it is judged whether there is transmission-waiting data (step S4). If there is transmission-waiting data, a transmission activation process is executed (step S5). After this, the processing returns to step S1.

In step S4, if there is no transmission-waiting data, it is judged whether the wireless communication operation is necessary (step S6). If the wireless communication operation is necessary, the wireless communication operation is executed (step S7) and then, the processing returns to step S1. Further, in step S6, if the wireless communication operation is unnecessary, the processing directly returns step S1.

Figure 15:
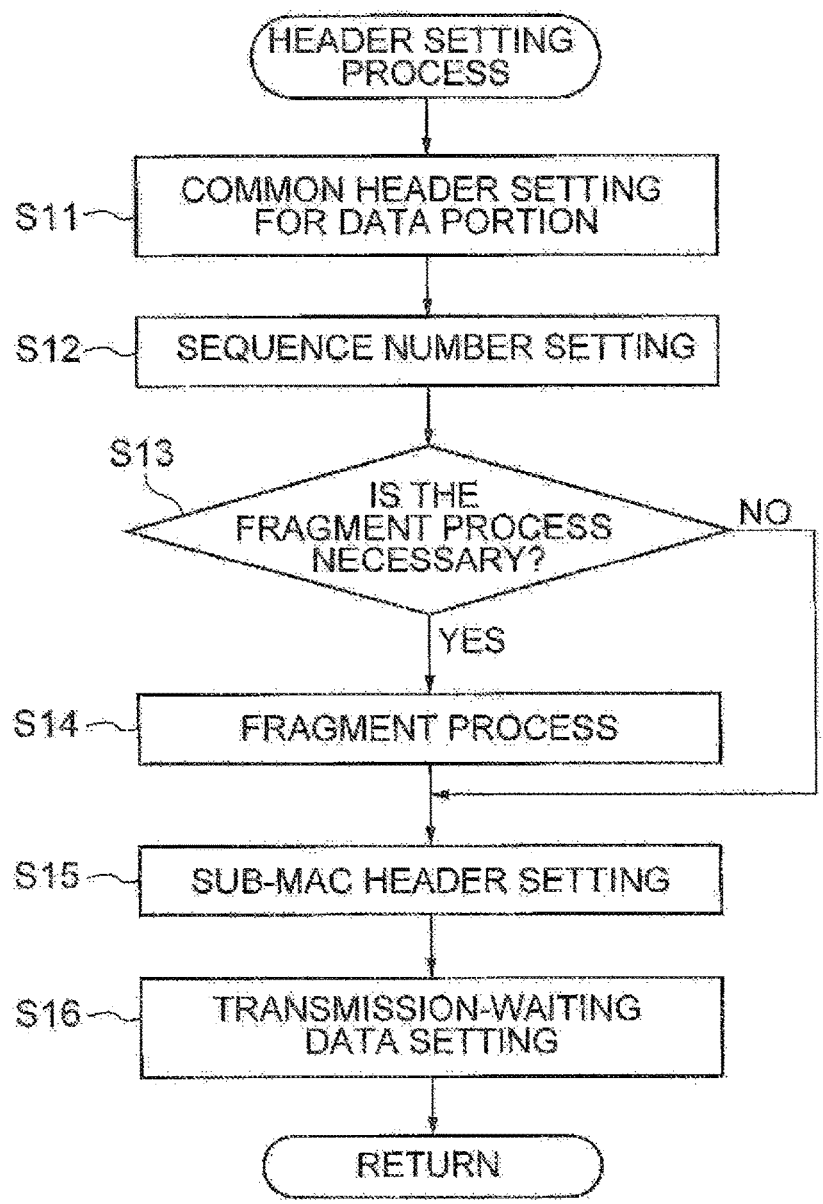
FIG. 15 is a flow chart showing an exemplary header setting process of the communication apparatus according to the embodiment of the present invention.

Next, with reference to the flow chart in FIG. 15, a header setting subroutine according to this example will be described. First, settings are made for the common MAC header for data portions (step S11) using the address information of the reception destination apparatus, the transmission source apparatus (its own) address information, and the like. A sequence number setting is carried out for each transaction (step S12). It is judged whether the fragmentation process is necessary (step S13). If necessary, the fragmentation process is executed to have a predetermined size (step S14). If the fragmentation process is unnecessary, the process in step S14 is not carried out.

Next, the sub-MAC header is set using the sequence number, the information of the fragmentation process, a data length, and the like (step S15). The data is set as transmission-waiting data (step S16), and the processing returns to the main routine.

Figure 16:
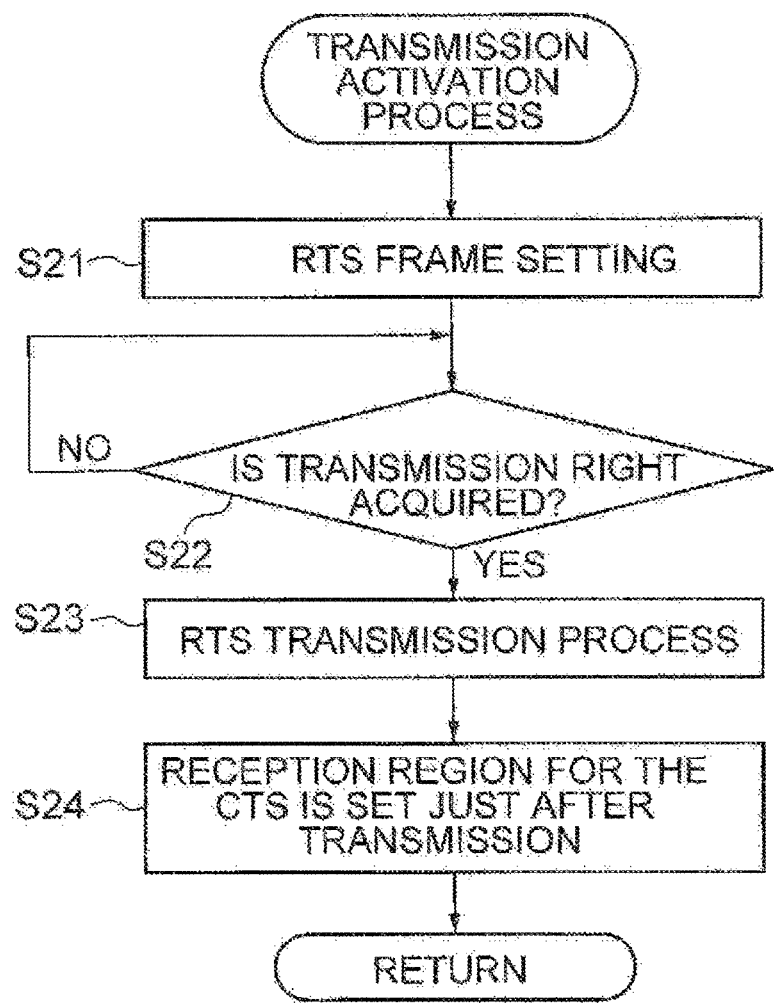
FIG. 16 is a flow chart showing an exemplary transmission activation process of the communication apparatus according to the embodiment of the present invention.

Next, with reference to the flow chart shown in FIG. 16, a transmission activation subroutine will be described. First, settings are made for the RTS frame before the data transmission (step S21). Then, the apparatus acquires its transmission right on the basis of a predetermined access control (step S22).

When the transmission right is acquired, the RTS frame of which setting has been done is transmitted (step S23). Further, to receive the CTS transmitted from the reception destination apparatus just after this, a setting is made (step S24) for its own reception region just after the transmission. Then, the processing terminates the sequential processes and returns to the main routine.

Figure 17:
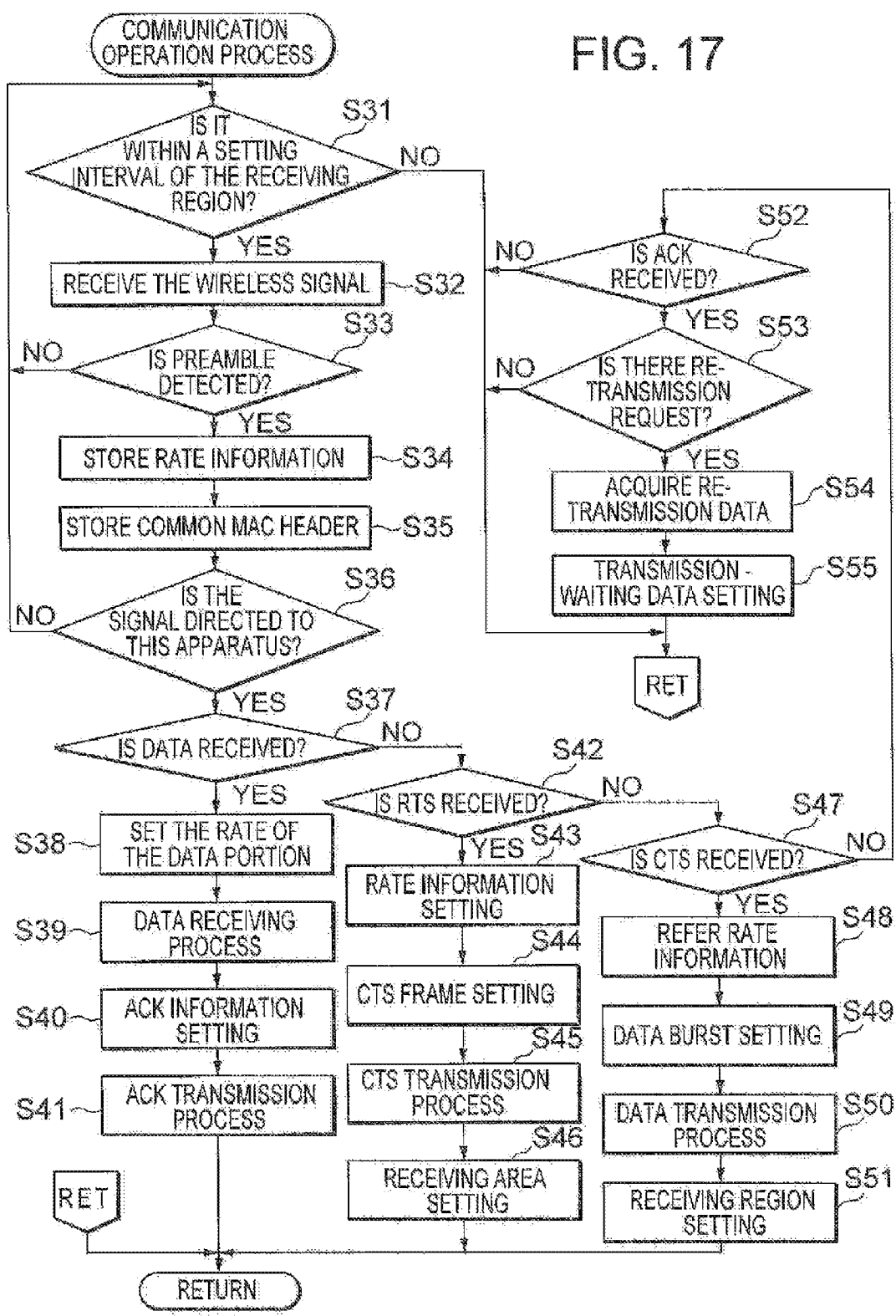
FIG. 17 is a flow chart showing an exemplary communication process of the communication apparatus according to the embodiment of the present invention.
Figure 20:
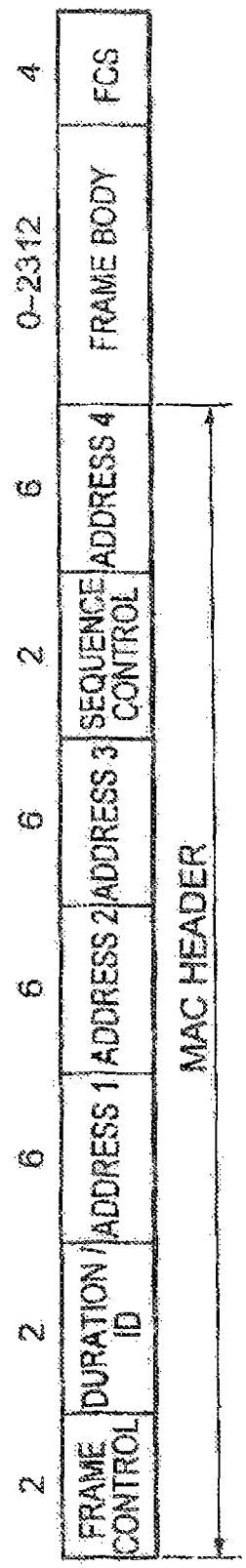
FIG. 20 is an illustration showing an example of a MAC header and body frame format according to related art.
Figure 21:
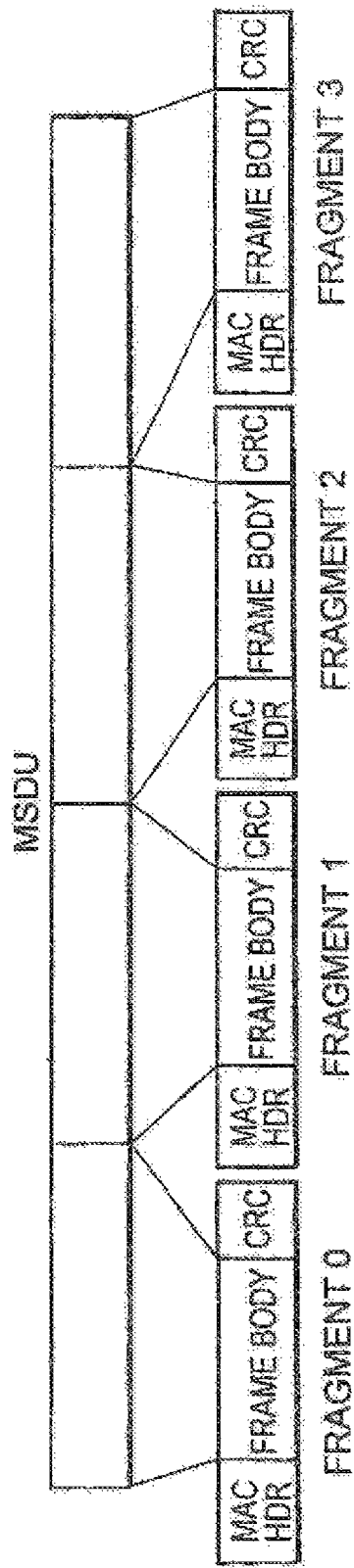
FIG. 21 is an illustration showing an example of a MAC header and body frame format according to related art.
Figure 22:
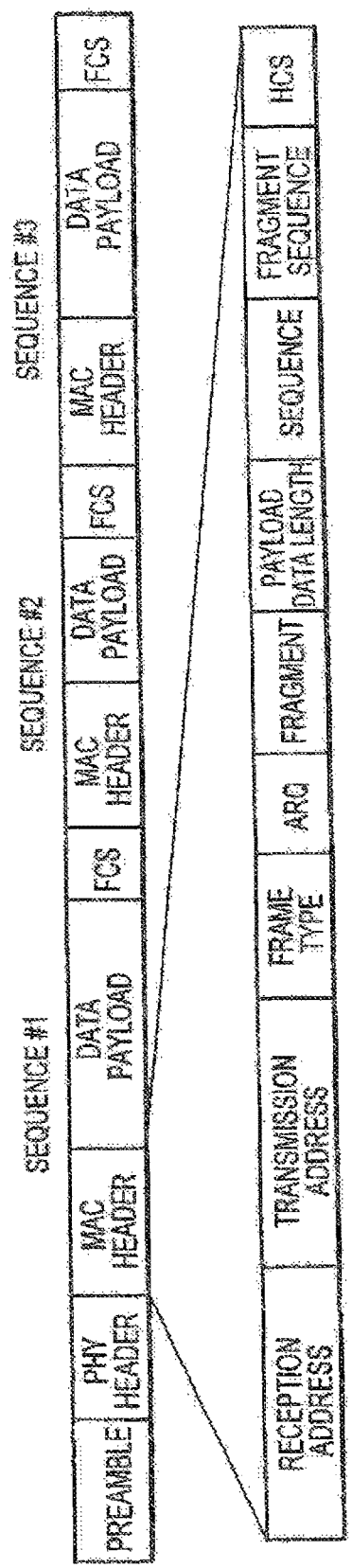
FIG. 22 is an illustration showing an example of a MAC header and body frame format according to related art.

Next, with reference to the flow chart in FIG. 17, the subroutine of the communication operation according to this example will be described. First, it is detected whether it is within the setting interval of the reception region (step S31). In a case where it is within the setting interval, a wireless signal is received (step S32). In a case where a preamble signal is detected in step S33, the rate information for a data payload portion or the like from the PHY header provided just after the Preamble is stored (step S34).

Further, the common MAC header is received and the data is stored (step S35). It is confirmed whether the signal is directed to this apparatus with reference to the address information (step S36). In the step S36, when the Preamble cannot be detected and when the signal is not directed to this apparatus, the processing returns to the step S31 to repeat this operation. In the step S36, when the signal is directed to this apparatus, it is judged which type of the frame is transmitted with reference to the frame type information in the common MAC header.

In a case where it is determined that the type of the frame is a data frame (step S37), the rate for the data payload is set (step S38) with the rate information stored in step S34. Next, a reception process for the data payload is carried out (step S39). Further, in accordance with success or fail in the reception of the data, AKC information is generated (step S40). A replying process of the ACK is carried out just after the reception (step S41), and the processing terminates the sequential processes and returns to the main routine.

In a case where it is determined that the frame is not a data frame in the step S37, it is judged whether or not the frame is an RTS frame (step S42). In a case where an RTS frame is received, in accordance with the receiving condition of the RTS frame, an available transmission rate is set for the data section (step S43). Further, the transmission source of the RTS frame is set to the reception destination address, and with these pieces of information, settings are made for the CTS frame (step S44). Just after this, a replying process of the CTS is performed in Step S45. Next, the receiving region of the data is set in step S46, and the processing terminates the sequential processes and returns to the main routine.

In a case where it is determined that the frame is not an RTS frame in the step S42, it is judged whether or not the frame is a CTS frame (step S47). If the CTS frame corresponding to the RTS frame transmission from this apparatus is received, the rate information described at the common MAC header is referred (step S48). With the stored data, the setting is made for the data burst (step S49), and an actual data transmission process is performed (step S50). Further, the reception region of the ACK is set (step S51), and the processing terminates the sequential process and returns to the main routine.

In a case where it is determined that the frame is not a CTS frame in the step S47, it is judged whether or not the frame is an ACK frame (step S52). If an ACK frame is received, it is judged whether or not there is a re-transmission request from the ACK information (step S53). If there is a re-transmission request, the data to be re-transmitted is acquired (step S54), and a setting is made to deal with the data as transmission-waiting data (step S55). The processing terminates the sequential processes and returns to the main routine.

When it is without the setting interval of the reception region in step S31, when any ACK is not received in step S52, and when re-transmission is unnecessary in step S53, the processing terminates sequential processes and returns to the main routine.

The above embodiment is described with an example of a special communication apparatus for transmission and reception shown in FIG. 2. However, other structures are possible. For example, a board or a card for executing the communication process corresponding to the transmission section and the reception section in the above-described example is attached to a personal computer for various data processes, and software for the corresponding communication control is installed in the personal computer. The program installed in the data processing apparatus such as the personal computer may be distributed with various recording (storing) media such as an optical disc or a memory card or may be distributed through the Internet.

What is claimed is:

1. An information processing method for a wireless communication system, the method comprising:
under control, by a processing device,
obtaining a plurality of medium access control (MAC) data units for transmitting a single burst comprising the plurality of the MAC data units,
adding a plurality of headers, each of the plurality of the headers for a respective MAC data unit of the plurality of the MAC data units and including length information of the respective MAC data unit,
generating an aggregated data unit including a plurality of sets of the each of the plurality of headers and the respective MAC data unit,
adding, to the aggregated data unit, a single common header including rate information regarding a modulation process of the aggregated data unit and total data length information regarding total data length of the single burst, and
outputting the single burst including the single common header and the aggregated data unit.

2. The information processing method according to claim 1, wherein the each of the plurality of the headers includes a sequence for detecting an error.

3. The information processing method according to claim 2, wherein the wireless communication system is a wireless local area network (WLAN) system using Orthogonal Frequency Division Multiplex (OFDM).

4. The information processing method according to claim 3, further comprising:
under control, by the processing device, an antenna to wirelessly transmit the single burst comprising the plurality of the MAC data units.

5. The information processing method according to claim 4,
wherein the antenna wirelessly receives data from a transmitter transmitting the single burst comprising the plurality of the MAC data units.

6. The information processing method according to claim 5, wherein the processing device is coupled to a storage unit and processes data read from the storage unit.

7. The information processing method according to claim 6, further comprising:
under control, by the processing device, an interface coupled to the storage unit to exchange information with a device coupled to the processing device.

8. An information processing method for a wireless communication system, the method comprising:
under control, by a processing device,
obtaining from a single burst an aggregated data unit, in which the single burst comprises the aggregated data unit and a single common header, in which the aggregated data unit includes a plurality of sets of each of a plurality of headers and a respective medium access control (MAC) data unit of a plurality of MAC data units, and in which the each of the plurality of the headers includes length information of the respective MAC data unit,
analyzing the single common header including rate information regarding a modulation process of the aggregated data unit and total data length information regarding total data length of the single burst,
analyzing one of the plurality of headers including length information of one of the plurality of the MAC data units, and
identifying the one of the plurality of data units.

9. The information processing method according to claim 8, wherein at least one of the plurality of the headers includes a sequence for detecting an error.

10. The information processing method according to claim 9, wherein the wireless communication system is a wireless local area network (WLAN) system using Orthogonal Frequency Division Multiplex (OFDM).

11. The information processing method according to claim 10, further comprising:
under control, by the processing device, an antenna to wirelessly receive the single burst comprising the plurality of the MAC data units.

12. The information processing method according to claim 11, wherein the antenna wirelessly transmits data to a transmitter transmitting the single burst comprising the plurality of the MAC data units.

13. The information processing method according to claim 12, wherein the processing device is coupled to a storage unit and processes data read from the storage unit.

14. The information processing method according to claim 13, further comprising:
under control, by the processing device, an interface coupled to the storage unit to exchange information with a device coupled to the processing device.

15. The information processing method according to claim 1, wherein the total data length includes a length of the plurality of sets of the each of the plurality of headers and the respective MAC data unit.

* * * * *